United States Patent
Wu et al.

(10) Patent No.: US 11,867,501 B2
(45) Date of Patent: Jan. 9, 2024

(54) INTEGRATED CALIBRATION TOOL FOR OPTICAL INSTRUMENT ENTRANCE PUPIL 6-AXIS SPATIAL ALLOCATION

(71) Applicant: MLOptic Corp, Redmond, WA (US)

(72) Inventors: Pengfei Wu, Nanjing (CN); Wei Zhou, Sammamish, WA (US); Jiang He, Nanjing (CN); Siyuan Liang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 248 days.

(21) Appl. No.: 17/563,873

(22) Filed: Dec. 28, 2021

(65) Prior Publication Data

US 2023/0204351 A1 Jun. 29, 2023

(51) Int. Cl.
  *G01B 11/27* (2006.01)
(52) U.S. Cl.
  CPC .................................. *G01B 11/27* (2013.01)
(58) Field of Classification Search
  CPC ..... G01B 11/026; G01B 11/028; G01B 11/14; G01B 11/26; G01B 11/27; G01B 11/272
  USPC ........................................................ 356/399
  See application file for complete search history.

(56) References Cited

U.S. PATENT DOCUMENTS

| | | | | |
|---|---|---|---|---|
| 5,262,355 A | * | 11/1993 | Nishiguchi | H01L 21/67144 438/106 |
| 6,222,198 B1 | * | 4/2001 | Brown | G03F 9/7003 250/548 |
| 6,281,966 B1 | * | 8/2001 | Kenmoku | G03F 9/7026 355/53 |
| 6,366,349 B1 | * | 4/2002 | Houde-Walter | G02B 5/32 356/153 |
| 7,501,602 B2 | * | 3/2009 | Yamazaki | B23K 26/042 356/400 |
| 2003/0048960 A1 | * | 3/2003 | Outsuka | G03F 9/7069 382/294 |
| 2015/0261097 A1 | * | 9/2015 | Mathijssen | G03F 7/70141 355/67 |
| 2019/0146364 A1 | * | 5/2019 | Zhou | G03F 7/70716 356/620 |

OTHER PUBLICATIONS

Pulsar Engineering, Measuring Small Angles Deviations, 2016 (Year: 2016).*

* cited by examiner

*Primary Examiner* — Steven Whitesell Gordon
(74) *Attorney, Agent, or Firm* — Jong Patent Firm; Cheng Ning Jong; Tracy P. Jong

(57) ABSTRACT

A system for calibrating an equipment, the system including a beam splitter; a first reticle configured to be removably attached to the equipment; and an image capture device including an image plane, wherein an image of the first reticle is configured to be received by way of the beam splitter at the image plane along an optical axis of the beam splitter, wherein the orientation as indicated by the first reticle is compared to an orientation of the image plane and if the orientation as indicated by the first reticle differs from the orientation of the image plane, the equipment is rotated about the optical axis of the beam splitter such that the orientation as indicated by the first reticle matches the orientation of the image plane.

15 Claims, 2 Drawing Sheets

INTEGRATED CALIBRATION TOOL FOR OPTICAL INSTRUMENT ENTRANCE PUPIL 6-AXIS SPATIAL ALLOCATION

BACKGROUND OF THE INVENTION

1. The Field of the Invention

The present invention relates to a calibration tool with imaging capability for 6-axis spatial allocation. More specifically, the present invention is directed to an instrument entrance pupil calibration tool with imaging capability for 6-axis allocation.

2. Background Art

In one application, a calibration tool is required for measuring the depth or distance in the Z-direction with the Z-direction being a direction of the optical path of the calibration tool. For instance, outputs of a conventional chromatic confocal sensor can be used to produce positional measurements of an equipment based on Z-direction measurements. A conventional chromatic confocal sensor can be disposed at various X-Y positions in an X-Y-coordinate plane to obtain the Z-direction data, thereby extending its use to populate positional data of an equipment having its position measured in distances from an X-Y plane to result in positional data represented in an (X, Y, Z) coordinate system or orientation specified in angles of rotation about the X-axis, Y-axis and Z-axis, respectively. However a conventional chromatic confocal sensor is only capable of producing a three-dimensional location that can be specified with the (X, Y, Z) coordinate system and an orientation (or (RX, RY, RZ) where RX represents an angle about the X-axis or tip, RY represents an angle about the Y-axis or tilt and RZ represents an angle about the Z-axis or rotation) that is specified in rotations about only two out of the three axes of the base coordinates if the features of an equipment to be detected are symmetrical about the Z-axis, an axis co-axial with the optical axis of the chromatic confocal sensor. Therefore, in a conventional chromatic confocal used in conjunction with, e.g., an equipment having an entrance pupil aligned coaxially with the conventional chromatic confocal sensor, no RZ or rotation data would be available as the features of the entrance pupil or other features surrounding the entrance are symmetrical about the optical axis of the sensor. Further, the procurement cost for chromatic confocal sensors is relatively high.

There exists a need for a calibration tool capable of providing an indication of all the rotational angles about all of the X, Y and Z-axes and one which is capable of providing positional information in the X, Y and Z-axes coordinate space where the procurement cost for the calibration tool falls within a range that is relatively accessible to optical equipment manufacturers.

SUMMARY OF THE INVENTION

In accordance with the present invention, there is provided a system for calibrating an equipment, the system including:
(a) a beam splitter;
(b) a first reticle configured to be removably attached to the equipment; and
(c) an image capture device including an image plane, wherein an image of the first reticle is configured to be received by way of the beam splitter at the image plane along an optical axis of the beam splitter,
wherein the orientation as indicated by the first reticle is compared to an orientation of the image plane and if the orientation as indicated by the first reticle differs from the orientation of the image plane, the equipment is rotated about the optical axis of the beam splitter such that the orientation as indicated by the first reticle matches the orientation of the image plane.

In one embodiment, the system further includes a second reticle, wherein the second reticle is configured to be removably attached to the beam splitter and an image of the second reticle is configured to be received by way of the beam splitter at the image plane along the optical axis of the beam splitter, wherein the orientation as indicated by the second reticle is compared to the orientation of the image plane and if the orientation as indicated by the second reticle differs from the orientation of the image plane, at least one of a position and an orientation of the image capture device is adjusted such that the orientation as indicated by the second reticle matches the orientation of the image plane.

In one embodiment, the orientation as indicated by the first reticle is compared to the orientation of the image plane and if the orientation as indicated by the first reticle differs from the orientation of the image plane, the equipment is rotated about the optical axis of the beam splitter such that the orientation as indicated by the first reticle matches the orientation of the image plane.

In one embodiment, the image of the first reticle is focused on the image plane and a first magnification of the image of the first reticle is obtained by comparing a dimension of the image of the first reticle to a corresponding dimension of the first reticle, the second reticle further includes a known position, the image of the second reticle is focused on the image plane and a second magnification of the image of the second reticle is obtained by comparing a dimension of the image of the second reticle to a corresponding dimension of the second reticle, the position of the first reticle with respect to the second reticle is calculated based in part on the first magnification and the second magnification.

In one embodiment, the system further includes a directional light source configured to be transmitted by the beam splitter and cast onto the image plane at a first spot and configured to be reflected by the beam splitter and directed to the equipment, a reflection of the light source by the equipment is directed by the beam splitter to the image plane at a second spot, wherein if the second spot is not incident upon the first spot, the equipment is said to be disposed in an orientation that is not orthogonal to the optical axis of the beam splitter. In one embodiment, the directional light source includes a laser beam.

In one embodiment, the first reticle includes an aperture to enable the light source to image an area of the equipment within the first reticle. In one embodiment, the equipment is an optical imaging system with an external aperture, an optical imaging system with a rotational alignment requirement or a combination thereof. In one embodiment, the image capture device is a charge-coupled device (CCD) camera.

An object of the present invention is to provide a tool capable of providing an indicator such that the orientation of an equipment about an optical axis of the tool can be obtained or indicated.

Another object of the present invention is to provide a tool capable of providing positional data and rotational data including an indication of rotational angles about all X, Y and Z-axes.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—light source
4—beam splitter
6—image capture device or camera
8—instrument or equipment to be measured or calibrated
10—optical lens group
12—image plane
14—surface of equipment to be measured or calibrated
16—entrance pupil to equipment
18—cast image of reticle A—
20—cast image of reticle B
22—spot at which image of transmitted light beam is cast
24—spot at which image of light beam reflected by beam splitter is cast
26—optical axis of beam splitter
28—center of image plane
30—aperture
32—optically reflective surface
34—cross-hair
36—angle of rotation about Y-axis Particular Advantages of the Invention The present system is useful for determining not only the position of an equipment in X, Y and Z-axes where these axes are mutually orthogonal to one another, but also the angles of rotation about these axes.

The present system is useful for determining whether a portion of an equipment to be measured is disposed orthogonally with respect to an optical axis of the present system. If not disposed orthogonally, the orientation of the equipment to be measured can be adjusted such that a simple orthogonality indicator can be used to ensure that the orientation is at target.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
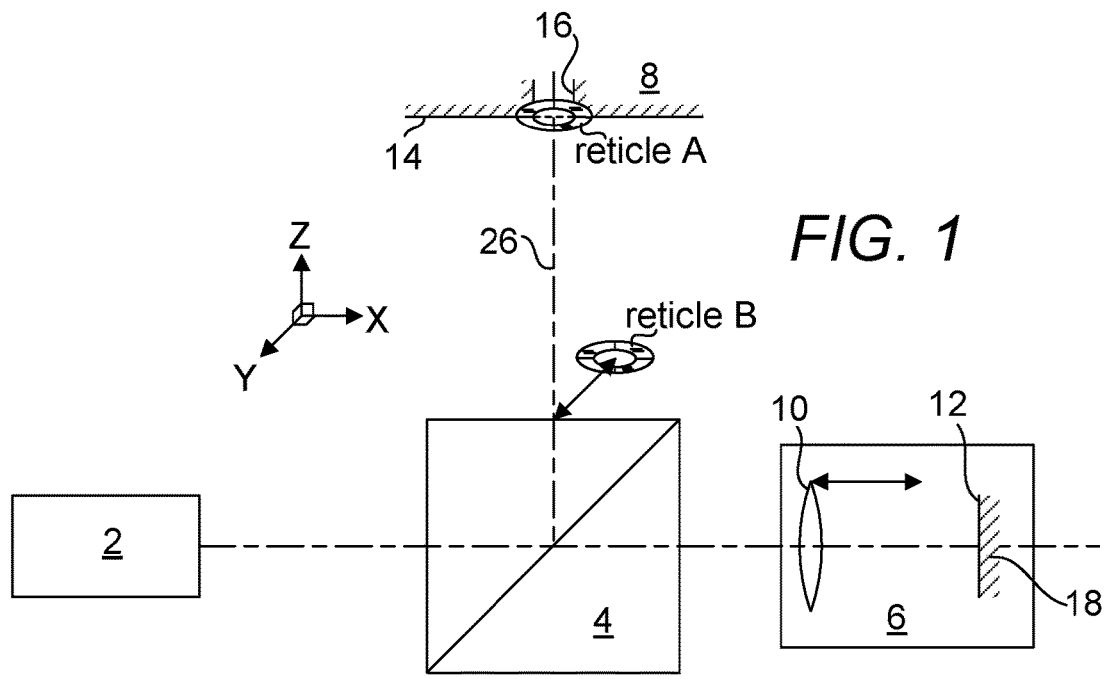
FIG. 1 is a diagram depicting a present system for calibrating an equipment with an external entrance pupil.
Figure 2:
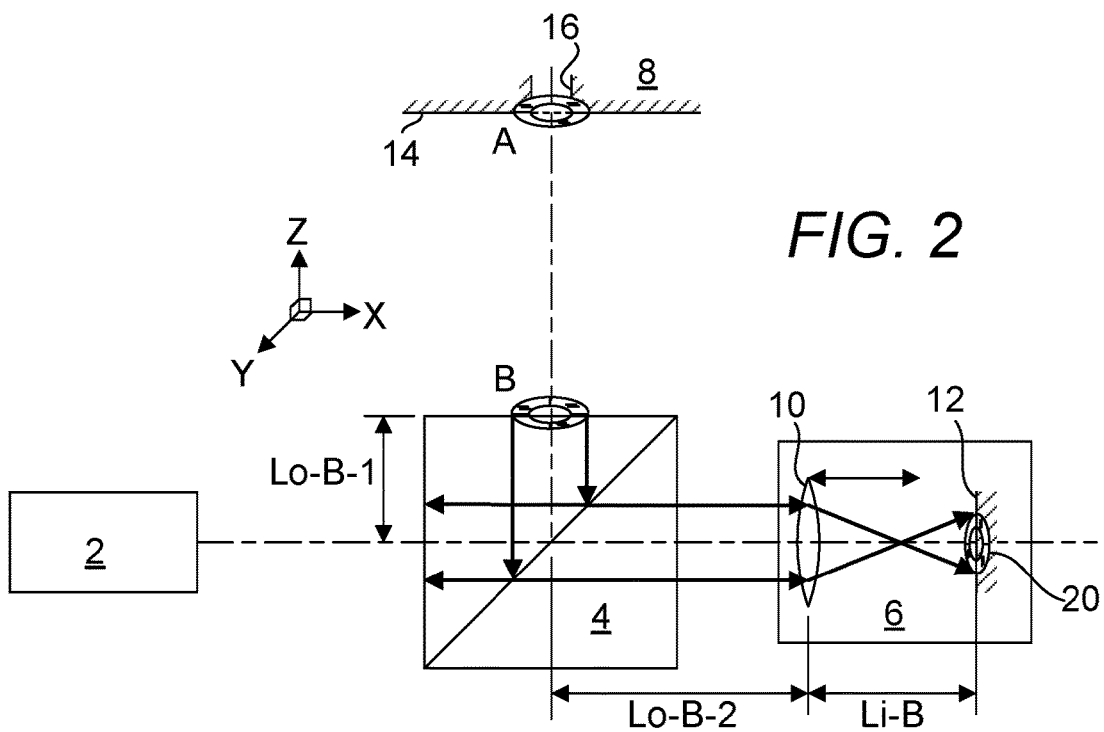
FIG. 2 is a diagram depicting a present system of FIG. 1 being used for self-calibration of the present system for its orientation about its optical axis and for obtaining a distance between the optical lens group of the camera and the second reticle.
Figure 3:
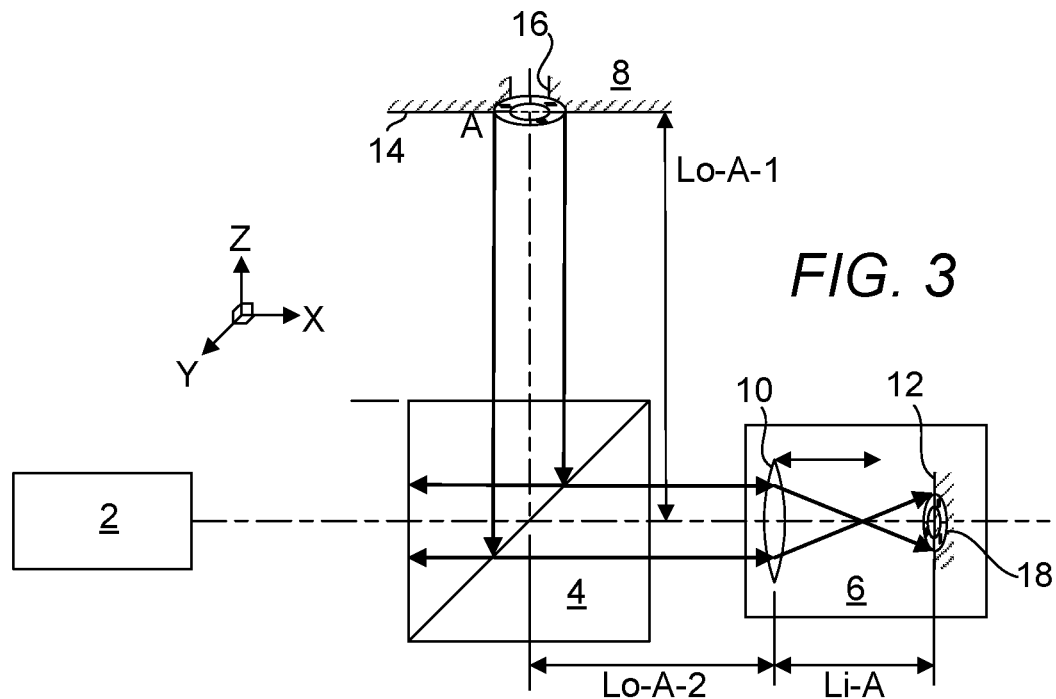
FIG. 3 is a diagram depicting a present system of FIG. 1 being used for obtaining a distance between the optical lens group of the camera and the first reticle.

FIG. 1 is a diagram depicting a present system for calibrating an equipment 8 with an external entrance pupil 16. In one example, the equipment 8 is an optical imaging system with an external aperture 16, e.g., entrance pupil. In another example, the equipment is an optical imaging system with a rotational alignment requirement. FIG. 2 is a diagram depicting a present system of FIG. 1 being used for self-calibration of the present system for its orientation about its optical axis 26 and for obtaining a distance between the optical lens group 10 of the camera 6 and the second reticle or reticle B or the object distance for reticle B and also the image distance or the distance between the image plane 12 and the optical lens group 10 of the camera 6. Here, an image 20 of reticle B is cast upon the image plane 12. FIG. 3 is a diagram depicting a present system of FIG. 1 being used for obtaining a distance between the optical lens group 10 of the camera 6 and the first reticle or reticle A or an object distance. Here, an image 18 of reticle A is cast upon the image plane 12. In the embodiment shown in FIG. 1, a beam splitter 4 is aligned on center with a camera 6 such that an image of an object aligned with the optical axis of the beam splitter 26 can be cast on an image plane 12 of the camera 6. In another embodiment not shown, a camera may alternatively be aligned with its optical axis aligned with the Z-axis. However, as shall be demonstrated elsewhere herein, a beam splitter is used to enable the use of another input without the need to rearrange components of the present system. Shown herein are also two reticles, i.e., reticles A and B. The purpose of having reticle B is two-fold. First, if necessary, the alignment of the camera 6 can be self-calibrated using this reticle. Reticle B is configured to be removably attached to the beam splitter 4 and an image of reticle B is configured to be received by way of the beam splitter 4 at the image plane 12 along the optical axis 26 of the beam splitter. The orientation as indicated by reticle B is compared to the orientation of the image plane 12 and if the orientation as indicated by reticle B differs from the orientation of the image plane 12, the position or orientation of the camera or image capture device 6, e.g., a charge-coupled device (CCD) camera, is adjusted such that the orientation as indicated by reticle B matches the orientation of the image plane 12. An orientation of the image plane 12 can be established using any grid lines disposed on the image plane 12. Second, reticle B can be used to obtain the distance between its position and the optical lens group 10, i.e., the distance represented by the summation of Lo-B-1 and Lo- B-2 or the object distance and the distance represented by Li-B or the image distance in FIG. 2. It shall be noted elsewhere herein that by having these distances, the distance between reticles A and B can be obtained. This distance is important as the positional information in the Z-axis can be established when it is available. Upon its use, reticle B can be removed such that it does not obscure light beams from other parts of the surface 14 of the equipment can be cast at the image plane 12. However, if desired, after the use of reticle A is no longer needed, reticle B can be left in place for the entirety of the rest of the calibration process as reticle B also has an aperture 30 which allows the entire calibration process to be carried out.

Figure 2A:
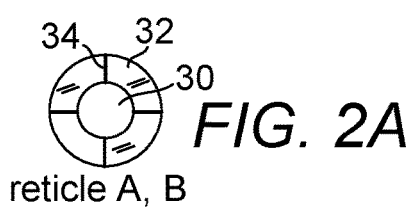
FIG. 2A is a top view of a reticle used herein.

FIG. 2A is a top view of a reticle used herein. Reticle A is configured to be removably attached to a surface 14 of the equipment to be measured or tested. Its function is also two-fold. First, reticle A is co-axially disposed with respect to the entrance pupil 16 of the equipment. Reticle A includes an aperture 30 to allow imaging of the interior parts of the entrance pupil of the equipment. Either one of the reticles, reticle A or B, includes a reflective surface 32 with two pairs of peripheral cross-hairs 34. This way, the orientation represented by each reticle can be readily discerned. Second, the distance between reticle A and the image plane 12 can be calculated. This distance is the aggregate of Lo-A-1, Lo-A-2 and Li-A.

In obtaining an orientation of the equipment, an image of the reticle A is configured to be received by way of the beam splitter 4 at the image plane along an optical axis of the beam splitter 4. The camera focus function is adjusted to obtain a focused image of reticle A on the image plane 12. This orientation is then compared to an orientation of the image plane 12. This orientation can be one that has been adjusted based on reticle B or one which has not been adjusted based on reticle B. The orientation as indicated by reticle A is compared to an orientation of the image plane 12 and if the orientation as indicated by reticle A differs from the orientation of the image plane, the equipment is rotated about the optical axis 26 of the beam splitter or Z-axis such that the orientation as indicated by reticle A matches the orientation of the image plane 12.

Optics equations can be used to solve for the distance between the two reticles, i.e., reticles A and B. The distance between an object, e.g., reticle A or B and the optical lens group 10 or Lo or an object and the distance between its cast image 18 and the optical lens group 10 or Li or an image distance are related using the equation $1/Lo+1/Li=1/EFL$ where EFL represents the effective focal length. Lo and Li are also related by equation $M=Lo/Li$ where M represents the magnification. EFL is a constant value for an optical lens group and M can be obtained by comparing the size of the image cast on the image plane and the known physical size of a reticle having an image cast on the image plane. Although for reticle A, Lo=Lo-A-1+Lo-A-2, and Li=Li-A and for reticle B, Lo=Lo-B-1+Lo-B-2, Li=Li-B, it is unnecessary to resolve all parts of these relationships to obtain the distance between the two reticles. Substituting the $Li=(1/M)*Lo$ of equation $1/Lo+1/Li=1/EFL$, $Lo=(1+M)*EFL$. As the M can be calculated and EFL is already a known quantity, Lo can be obtained. Subsequently Li can be obtained as well from equation $M=Lo/Li$. Having the total distance between each reticle and the image plane, the difference between these distances yields the distance between the two reticles or the distance between the equipment and a top surface of the reticle B or a quantity in the Z-direction.

Figure 4:
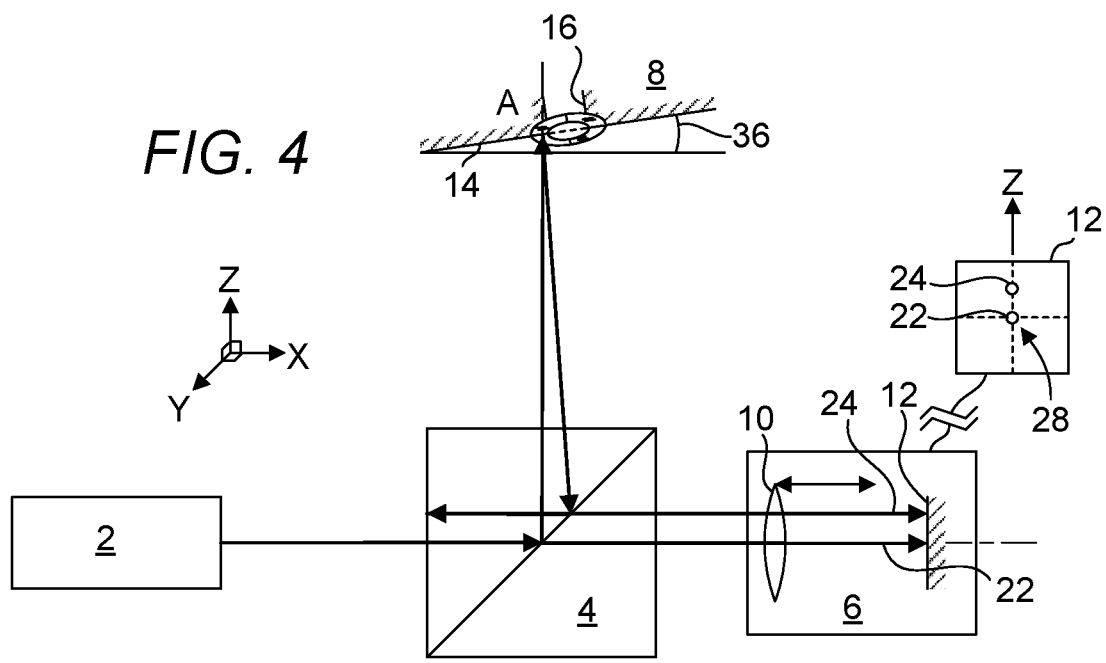
FIG. 4 is a diagram depicting a present system of FIG. 1 being used for obtaining orientations of the equipment about axes orthogonal to the optical axis of the beam splitter.

FIG. 4 is a diagram depicting a present system of FIG. 1 being used for obtaining orientations of the equipment about axes orthogonal to the optical axis 26 of the beam splitter. In one embodiment, the system includes a directional light source 2 configured to be transmitted by the beam splitter 4 and cast onto the image plane 12 at a first spot 22 and configured to be reflected by the beam splitter 4 and directed to the equipment, a reflection of light source by the equipment is directed by the beam splitter to the image plane at a second spot 24, wherein if the second spot 24 is not incident upon the first spot 22, the equipment is said to be disposed in an orientation that is not orthogonal to the optical axis of the beam splitter 4. Here an angle of rotation 36 about the Y-axis is identified and an adjustment to this angle can be made. It can be seen that, although not shown, the angle of rotation about the X-axis can be similarly determined. In one embodiment, the directional light source includes a laser beam for generating a light source with a small footprint.

In one embodiment, in carrying out the calibration of an equipment, the position of an equipment is first adjusted with respect to the present system. The camera 6 is first powered such that the entrance pupil 16 can first be located and orientated. The equipment to be measured, calibrated or tested shall be moved around until reticle A appears centrally on the image plane 12. If calibration of the present system is desired, this step should be performed prior to the other steps including positioning and orientating of the entrance pupil 16. In calibrating the present system, an image of reticle B, as it has been attached to a top surface of the beam splitter 4 along the optical axis 26, shall be obtained. The image shall be centered upon the image plane at center 28 and the image plane shall be orientated with respect to an orientation indicator of reticle B, e.g., by aligning a grid line of the image plane with a cross-hair of reticle B. The positioning and/or the orientation of either one of the components, i.e., the beam splitter 4 and camera 6, shall be adjusted. The orientation of the equipment about the Z-axis or angle of rotation about the Z-axis or RZ can then be calibrated using reticle A. The tip and tilt of the equipment can be calibrated using the strategies associated with FIG. 4. If desired, the positions of other surface features of the equipment can be identified in the same manner the reticles were identified.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system for calibrating an equipment, said system comprising:
    (a) a beam splitter;
    (b) a first reticle configured to be removably attached to the equipment;
    (c) an image capture device comprising an image plane, wherein an image of said first reticle is configured to be received by way of said beam splitter at said image plane along an optical axis of said beam splitter; and
    (d) a second reticle configured to be removably attached to said beam splitter and an image of said second reticle is configured to be received by way of said beam splitter at said image plane along the optical axis of said beam splitter,
    wherein the orientation as indicated by said second reticle is compared to an orientation of the image plane and if the orientation as indicated by said second reticle differs from the orientation of the image plane, at least one of a position and an orientation of the image capture device is adjusted such that the orientation as indicated by said second reticle matches the orientation of the image plane and the orientation as indicated by said first reticle is compared to the orientation of the image plane and if the orientation as indicated by said first reticle differs from the orientation of the image plane, the equipment is rotated about said optical axis of said beam splitter such that the orientation as indicated by said first reticle matches the orientation of the image plane.

2. The system of claim 1, wherein said image of said first reticle is focused on said image plane and a first magnification of said image of said first reticle is obtained by comparing a dimension of said image of said first reticle to a corresponding dimension of said first reticle, said second reticle further comprises a known position, said image of said second reticle is focused on said image plane and a second magnification of said image of said second reticle is obtained by comparing a dimension of said image of said second reticle to a corresponding dimension of said second reticle, the position of said first reticle with respect to said second reticle is calculated based in part on said first magnification and said second magnification.

3. The system of claim 1, further comprising a directional light source configured to be transmitted by said beam splitter and cast onto said image plane at a first spot and configured to be reflected by said beam splitter and directed to the equipment, a reflection of the light source by said equipment is directed by said beam splitter to said image plane at a second spot, wherein if the second spot is not incident upon said first spot, the equipment is said to be disposed in an orientation that is not orthogonal to said optical axis of said beam splitter.

4. The system of claim 3, wherein said first reticle comprises an aperture to enable said light source to image an area of the equipment within said first reticle.

5. The system of claim 3, wherein said directional light source comprises a laser beam.

6. The system of claim 1, wherein the equipment is an equipment selected from the group consisting of an optical imaging system with an external aperture, an optical imaging system with a rotational alignment requirement and a combination thereof.

7. The system of claim 1, wherein said image capture device is a charge-coupled device (CCD) camera.

8. A system for calibrating an equipment, said system comprising:
    (a) a beam splitter;
    (b) a first reticle configured to be removably attached to the equipment;
    (c) an image capture device comprising an image plane, wherein an image of said first reticle is configured to be received by way of said beam splitter at said image plane along an optical axis of said beam splitter; and
    (d) a directional light source,
    wherein the orientation as indicated by said first reticle is compared to an orientation of the image plane and if the orientation as indicated by said first reticle differs from the orientation of the image plane, the equipment is rotated about said optical axis of said beam splitter such that the orientation as indicated by said first reticle matches the orientation of the image plane and said directional light source is configured to be transmitted by said beam splitter and cast onto said image plane at a first spot and configured to be reflected by said beam splitter and directed to the equipment, a reflection of the light source by the equipment is directed by said beam splitter to said image plane at a second spot, wherein if the second spot is not incident upon said first spot, the equipment is said to be disposed in an orientation that is not orthogonal to said optical axis of said beam splitter.

9. The system of claim 8, wherein said system further comprises a second reticle, wherein said second reticle is configured to be removably attached to said beam splitter and an image of said second reticle is configured to be received by way of said beam splitter at said image plane along the optical axis of said beam splitter,
    wherein the orientation as indicated by said second reticle is compared to the orientation of the image plane and if the orientation as indicated by said second reticle differs from the orientation of the image plane, at least one of a position and an orientation of the image capture device is adjusted such that the orientation as indicated by said second reticle matches the orientation of the image plane.

10. The system of claim 9, wherein the orientation as indicated by said first reticle is compared to the orientation of the image plane and if the orientation as indicated by said first reticle differs from the orientation of the image plane, the equipment is rotated about said optical axis of said beam splitter such that the orientation as indicated by said first reticle matches the orientation of the image plane.

11. The system of claim 9, wherein said image of said first reticle is focused on said image plane and a first magnification of said image of said first reticle is obtained by comparing a dimension of said image of said first reticle to a corresponding dimension of said first reticle, said second reticle further comprises a known position, said image of said second reticle is focused on said image plane and a second magnification of said image of said second reticle is obtained by comparing a dimension of said image of said second reticle to a corresponding dimension of said second reticle, the position of said first reticle with respect to said second reticle is calculated based in part on said first magnification and said second magnification.

12. The system of claim 8, wherein said first reticle comprises an aperture to enable said light source to image an area of the equipment within said first reticle.

13. The system of claim 8, wherein said directional light source comprises a laser beam.

14. The system of claim 8, wherein the equipment is an equipment selected from the group consisting of an optical imaging system with an external aperture, an optical imaging system with a rotational alignment requirement and a combination thereof.

15. The system of claim 8, wherein said image capture device is a charge-coupled device (CCD) camera.

* * * * *